Feb. 2, 1937. J. BROWN 2,069,666
SPRING COVER
Filed May 13, 1935
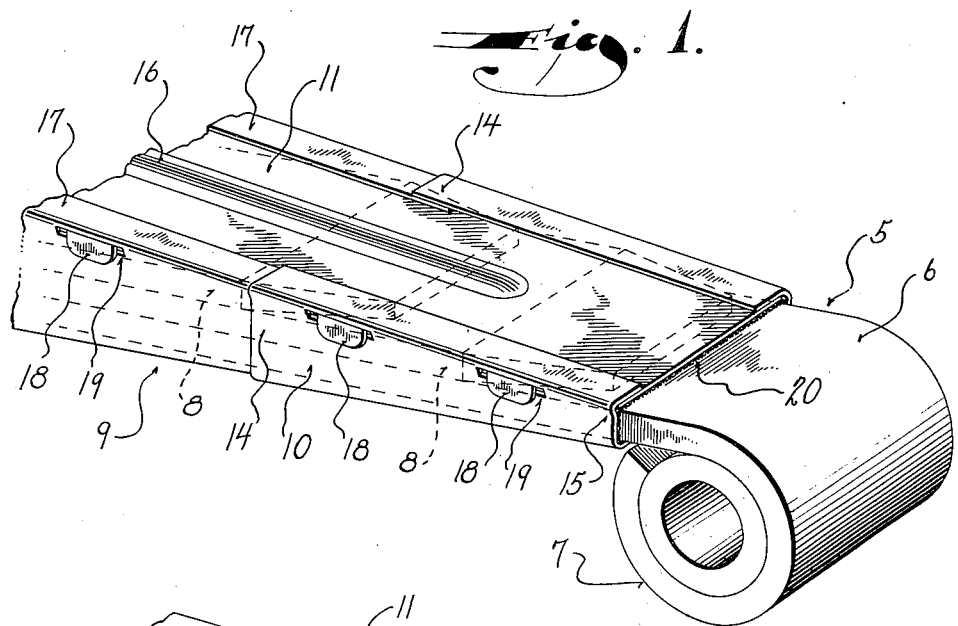
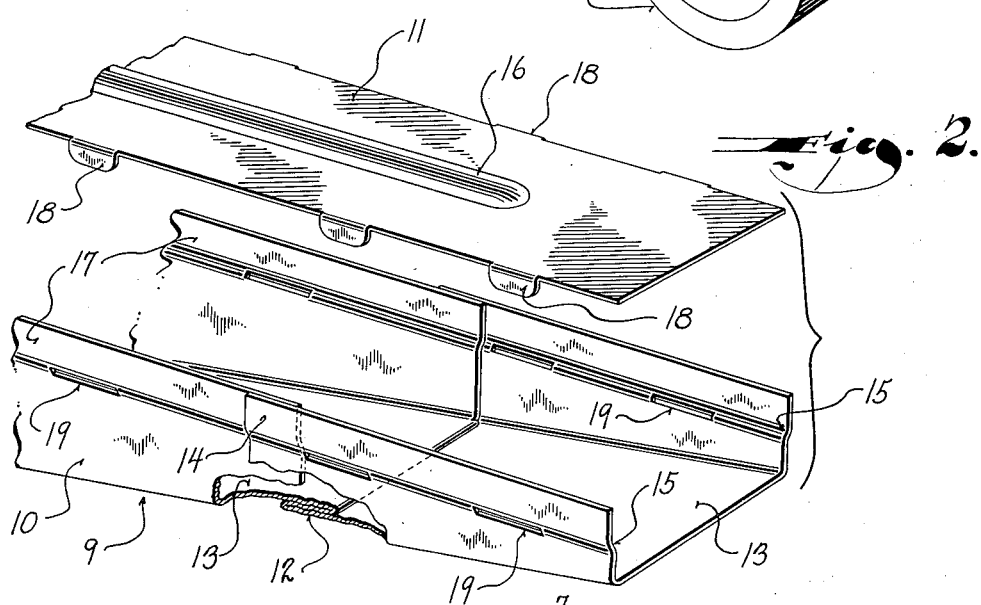
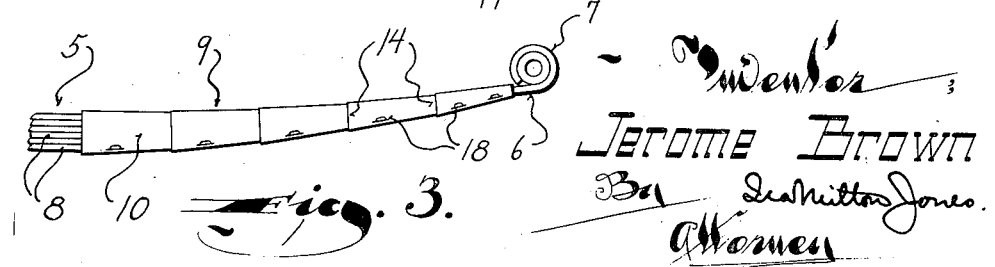
Inventor
Jerome Brown
By DeMilton Jones.
Attorney Patented Feb. 2, 1937

2,069,666

UNITED STATES PATENT OFFICE 2,069,666

SPRING COVER

Jerome Brown, Milwaukee, Wis., assignor to Briggs & Stratton Corporation, Milwaukee, Wis., a corporation of Delaware Application May 13, 1935, Serial No. 21,182

10 Claims. (Cl. 267—37)

This invention relates to improvements in spring covers and refers more particularly to sheet metal covers for vehicle leaf springs.

Spring covers now in general use are usually of one piece construction which is objectionable because it necessitates the use of special tools in applying the cover to a spring, and often the cover cannot be applied after the spring is in place on the vehicle.

With these and other objectionable features of the past and existing metal spring covers in view, this invention has as one of its objects to provide a cover so constructed that it will be readily applicable to a spring entirely without the use of special tools and even after the spring is in place on the vehicle.

Another object of this invention is to provide a spring cover composed of two complementary sections with a novel connection therebetween to allow for flexure of the spring.

Another object of this invention is to provide a novel connection between two separable sections of a sheet metal cover for leaf springs which is so constructed as to be secure against bursting stresses engendered either vertically or laterally.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a perspective view of an end portion of a conventional vehicle leaf spring with a cover constructed in accordance with this invention applied thereto;

Figure 2 is a perspective view of an end portion of the cover showing its sections separated; and Figure 3 is a view in side elevation of one-half of a conventional vehicle leaf spring with the cover of this invention applied thereto.

Referring now more particularly to the accompanying drawing in which like numerals indicate like parts throughout the several views, the numeral 5 indicates generally a vehicle leaf spring comprising a master leaf 6 provided with eyes 7 at each of its ends (only one end portion of the spring being shown) and a plurality of successively shorter secondary leaves 8. The cover indicated generally by the numeral 9 is formed entirely of sheet metal and consists of two complementary sections 10 and 11 which together embrace the spring.

The cover section 10 is U-shaped in cross section and covers the top and side walls of the spring, while the section 11 is substantially a flat flexible plate and covers the bottom of the spring. A reinforcing rib 16 may be pressed into the section 11 to add strength thereto without seriously affecting its flexibility.

The U-shaped section 10, to allow for flexure of the spring, is divided into a plurality of articulated units hingedly connected as at 12. The hinged connections 12 are conveniently formed by folding the bottom wall 13 of the U-shaped section 10 upon itself between adjacent units, as shown. Folding the bottom wall upon itself in this manner overlaps the adjacent ends of the side walls 14 of the articulated units sufficiently to maintain a continuous closure at the sides of the spring regardless of its flexure.

At their marginal edges the side walls 14 of all of the articulated units of the U-shaped section are offset as at 15 to provide shoulders or ledges with which the side edges of the section 11 engage. Flanges 17 formed by striking over the marginal edge portions of the side walls of the U-shaped section hold the side edges of the section 11 down on the shoulders or ledges 15.

To prevent spreading of the sides of the U-shaped section and possible displacement of the side edges of the flat section 11 from between the ledges 15 and the flanges 17, the flat section has a plurality of tongues 18 projecting perpendicularly from each side edge to pass through slots 19 in the ledges or shoulders 15 and overlie the outside of the side walls of the U-shaped section.

In assembling the cover on the spring the spring is first wrapped with a fabric 20 which may be saturated with lubricant and then the U-shaped section is applied. The flat section 11 is next placed in position with its side edges resting on the ledges or shoulders 15 and its tongues projecting through the slots 19.

With the sections assembled in this manner, the marginal edge portions of the U-shaped section are struck down over the flat section. In this manner, the two complementary sections are securely held assembled while allowing relative endwise motion therebetween which is necessary to compensate for flexure of the spring.

To allow for this relative endwise motion, the slots 19 are longer than the width of the tongues 18 and as will be readily apparent the difference in the length of the slots and the width of the tongues defines the degree of endwise motion permitted between the two sections.

From the foregoing description taken in connection with the accompanying drawing, it will be readily apparent to those skilled in the art to which this invention appertains, that this invention provides a spring cover of simple sturdy construction which may be applied to a leaf spring entirely without the need for special tools even after the spring is in place on the vehicle.

What I claim as my invention is:

1. A spring cover for a vehicle leaf spring comprising complementary sections which together encircle the spring, one of the sections being substantially U-shaped in cross section to cover three sides of the spring, and the other section being a substantially flat flexible plate to cover the remaining side of the spring, a connection between the sections comprising flanges on the marginal edges of the U-shaped section bent over the adjacent edges of the flat section, and tongues on the flat section extending through slots in the side walls of the U-shaped section to overlie the outer sides of said side walls of the U-shaped section and prevent spreading of said side walls, said slots being longer than the width of the tongues so as to allow limited relative endwise motion between the sections.

2. A spring cover for vehicle leaf springs comprising complementary sections which together encircle the spring, one of the sections consisting of articulated U-shaped sections which together cover three sides of the spring and the other section being substantially a flat flexible plate and covering the remaining side of the spring, the articulated construction of the U-shaped section and the flexibility of the flat section enabling the cover to flex with the spring, and a connection between the sections of the cover allowing relative endwise motion between the sections necessary to compensate for flexure of the spring, said connection comprising flanges on the marginal edges of the side walls of the U-shaped section bent over the side edge portions of the flat section, and tongues on the flat section extending through slots in the side walls of the U-shaped section and engaged over the outer faces of said side walls to hold the side walls against spreading, said slots being longer than the width of the tongues to permit the required relative endwise motion between the sections.

3. A spring cover for vehicle leaf springs comprising complementary sections which together encircle the spring, one of said sections consisting of articulated U-shaped sections and the other section being a substantially flat flexible plate, and a connection between the sections allowing relative endwise motion therebetween necessary to allow for flexure of the spring, said connection comprising ledges on the side walls of the U-shaped articulated units with which the side edges of the flat section engage, flanges on the marginal edges of the side walls of the U-shaped articulated units engaged over the adjacent portions of the flat section to clamp the same between the ledges and said flanges and tongues on the flat section extending through slots in the side walls of the articulated units adjacent the ledges therein so as to engage over the outer surfaces of the side walls and hold the same against spreading, and said slots being longer than the width of the tongues to allow for a degree of relative endwise motion between the sections.

4. A spring cover for vehicle leaf springs comprising two complementary sections, one of the sections being a substantially flat flexible plate and the other section being substantially U-shaped in cross section, the marginal edges of the side walls of said U-shaped section being adapted to be folded over the adjacent edges of the flat flexible plate to retain the sections assembled while allowing relative endwise motion therebetween, and means carried by the flat section and engaging the side walls of the U-shaped section to hold the same against spreading.

5. A spring cover for vehicle leaf springs comprising two complementary sections, one of the sections being a substantially flat flexible plate and the other section being substantially U-shaped in cross section, the marginal edges of the side walls of said U-shaped section being adapted to be folded over the adjacent edges of the flat flexible plate to retain the sections assembled while allowing relative endwise motion therebetween, means carried by the flat section and engaging the side walls of the U-shaped section to hold the same against spreading, and means for limiting the relative endwise motion between the sections.

6. A spring cover for vehicle leaf springs comprising two complementary sections, one of the sections being a substantially flat flexible plate and the other section being substanially U-shaped in cross section, the marginal edges of the side walls of said U-shaped section being adapted to be folded over the adjacent edges of the flat flexible plate to retain the sections assembled while allowing relative endwise motion therebetween, and common means for preventing spreading of the side walls of the U-shaped section and limiting relative endwise motion between the sections.

7. A spring cover for vehicle leaf springs comprising two complementary sections, one of the sections being a substantially flat flexible plate and the other section comprising a plurality of articulated U-shaped units, the marginal edges of said U-shaped units being adapted to be folded over the adjacent edges of the flat flexible plate to retain the sections assembled while allowing relative endwise motion between the sections, and interengaging means on said sections for holding the side walls of the U-shaped units against spreading and also limiting the relative endwise motion between the sections.

8. A spring cover for vehicle leaf springs comprising two complementary sections, one of which is a substantially flat flexible plate and the other being substantially U-shaped in cross section, the marginal edge portions of the side walls of the U-shaped section being offset to provide ledges with which the side edges of the flat flexible plate engage and the marginal edge portions of the side walls of the U-shaped section outwardly of said ledges being adapted to be folded over the adjacent edges of the flat plate to clamp said edge portions of the flat plate between said ledges and said flanges and thereby secure the sections assembled while allowing relative endwise motion between the sections, and means carried by the flat plate and engageable with the side walls of the U-shaped section to hold the same against spreading.

9. A spring cover for vehicle leaf springs comprising two complementary sheet metal sections, one of said sections being U-shaped in cross section to cover the sides and one wall of the spring and being composed of articulated units so as to accommodate flexure of the spring, the other section being in the form of a flat flexible plate covering the remaining wall of the spring and adapted to follow the flexure of the spring, the side walls of the first mentioned section being offset at their outer edge portions to define shoulders with which the side edges of the second mentioned section engage, flanges carried by the side walls of the first mentioned section and engaging down over the side edge portions of the flat section to confine the same between the flanges and said shoulders and thereby hold the sections assembled in a manner permitting relative endwise movement therebetween, and means to limit said relative endwise movement.

10. A spring cover for vertical leaf springs comprising complementary sections which together encircle the spring, one of the sections consisting of a plurality of articulated units each U-shaped in cross section to cover three sides of the spring, and the other section being a substantially flat flexible plate of a size to cover the remaining side of the spring, flanges on the marginal edges of the U-shaped units of the first named section bent over the adjacent edges of the flat section to hold the sections together while permitting relative endwise motion therebetween, and tongues on the edges of the flat section extending through slots in the side walls of the U-shaped units of the other section to overlie the outer faces of said side walls and prevent the spreading thereof, said slots being longer than the width of the tongues so as to allow limited relative endwise motion between any one of the articulated units and the flat section.

JEROME BROWN.